Feb. 22, 1966 D. H. FOLLETT 3,236,230

APPARATUS FOR RECORDING BLOOD PRESSURE

Filed Oct. 16, 1962 3 Sheets-Sheet 1

INVENTOR.
DOUGLAS HAROLD FOLLETT

BY [signature]

ATTORNEYS

APPARATUS FOR RECORDING BLOOD PRESSURE

Filed Oct. 16, 1962

3 Sheets-Sheet 2

INVENTOR.
DOUGLAS HAROLD FOLLETT
BY
Albert J. Jacobs
ATTORNEY

APPARATUS FOR RECORDING BLOOD PRESSURE

Filed Oct. 16, 1962

3 Sheets-Sheet 3

INVENTOR.
DOUGLAS HAROLD FOLLETT
BY
Albert J. Jacobs
ATTORNEYS

United States Patent Office 3,236,230
Patented Feb. 22, 1966

3,236,230
APPARATUS FOR RECORDING BLOOD PRESSURE
Douglas Harold Follett, Bristol, England, assignor to The United Bristol Hospitals, Bristol, England, a corporation of Great Britain and Northern Ireland
Filed Oct. 16, 1962, Ser. No. 230,909
Claims priority, application Great Britain, Oct. 19, 1961, 37,573/61
7 Claims. (Cl. 128—2.05)

This invention relates to an apparatus for recording blood pressure. More particularly it relates to apparatus which will measure blood pressure at intervals over periods of a day or two.

In the clinical procedure, a cuff around the upper arm is inflated, and then allowed to deflate slowly, the pressure being measured with a mercury manometer. At the same time a stethoscope is placed over the brachial artery just below the cuff.

At first, the blood is prevented from flowing by the high pressure in the cuff, but as the pressure falls, blood starts to flow at the highest pressure points in the cardiac cycle. This causes a sound to be heard through the stethoscope and the pressure corresponding to the first sound is taken to be the systolic pressure.

As the pressure falls still further, the sounds continue until a point is reached where the character changes from a hard sound to a muffled one, rapidly followed by complete disappearance of the sounds. The cuff pressure corresponding to one of these points (the exact one depending on the physician, but they are usually very close together) is taken as the diastolic pressure.

The clinical measurement of the blood pressure (particularly the diastolic), depends on a subjective phenomenon—the apparent change in sound quality, or the apparent cessation of sounds. If the sounds picked up by a microphone are recorded directly by a pen recorder etc., they do not cease as the cuff pressure falls below the diastolic pressure.

It is an object of the present invention to partially or wholly overcome the above disadvantage.

According to the present invention, there is provided an apparatus for recording blood pressure at predetermined intervals of time which includes means for converting the sounds from an artery into electrical signals, and means for processing these signals into a suitable form to operate a recording mechanism.

The processing means may include an amplifier and a filter whose response to the different frequencies is similar to that of the human ear. The electro-acoustic converting means may be a pair of microphones.

One preferred form of the present invention will now be described in greater detail by way of example with reference to the accompanying drawings wherein.

Figure 1:
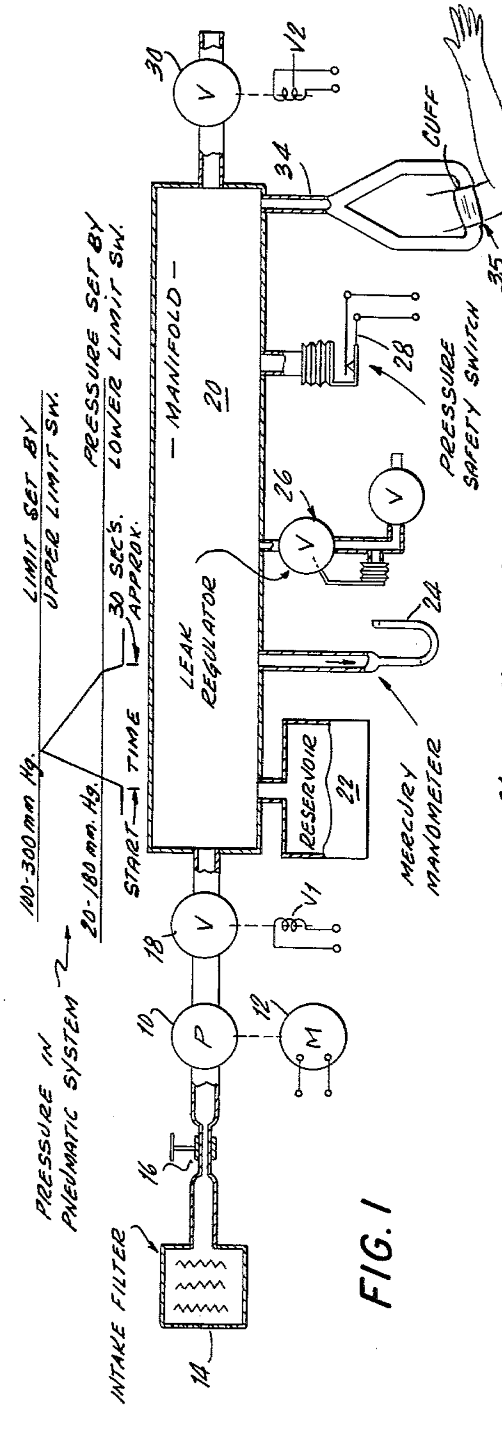
FIGURE 1 is a schematic diagram of the pneumatic system.

Referring to FIGURE 1, a pump 10 driven by an electric motor 12 draws air from an intake filter 14 through a constriction 16. The constriction 16 is adjustable in order to control the rate of pumping to the system. An electrically operated valve 18 is connected between the output from the pump 10 and the inlet of a manifold 20. A reservoir 22 is connected to the manifold 20 and acts as a reservoir to smooth out pressure fluctuations during pumping. The pressure of the air inside the manifold 20 is measured by means of a mercury manometer 24. A leak regulator 26 is always connected to the regulator, but the pump delivers air at such a rate that the leakage is overcome during the pressure build-up. The leak regulator 26 is adustable and essentially comprises a single diaphragm operated valve which to some extent linearizes the otherwise exponential fall of pressure with time. A pressure operated safety switch 28 is also connected to the manifold 20, and is adapted to release the pressure immediately should it exceed 320 mm. of mercury; it breaks the main electrical circuit of the system and causes an electrically operated valve 30 connected to the manifold 20 to open. A connection 34 joins the manifold to cuff 35 which, for example, is placed around the upper arm of the patient, as shown in FIGURE 1.

Figure 2:
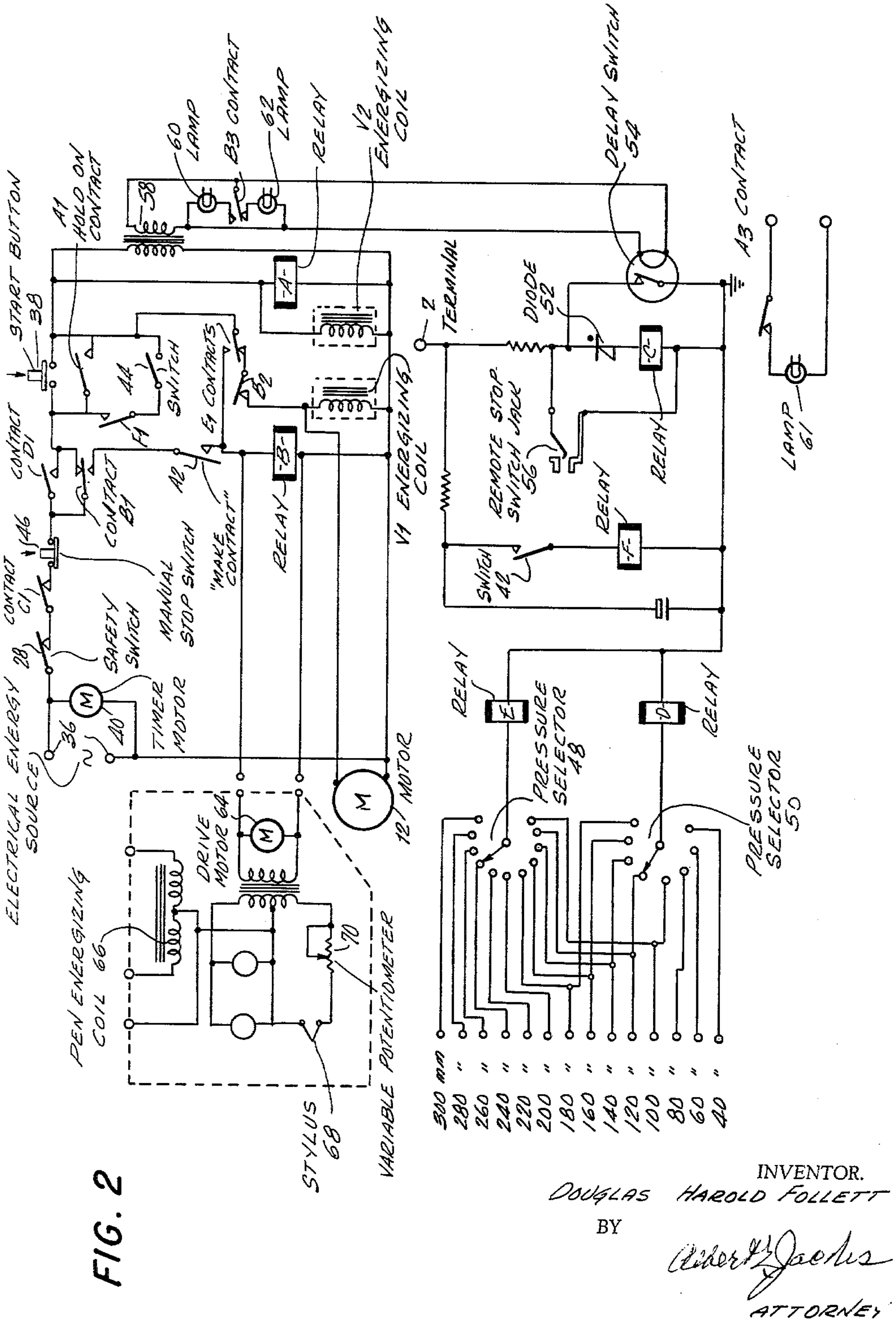
FIGURE 2 is a schematic diagram of the electrical control circuits.
Figure 4:
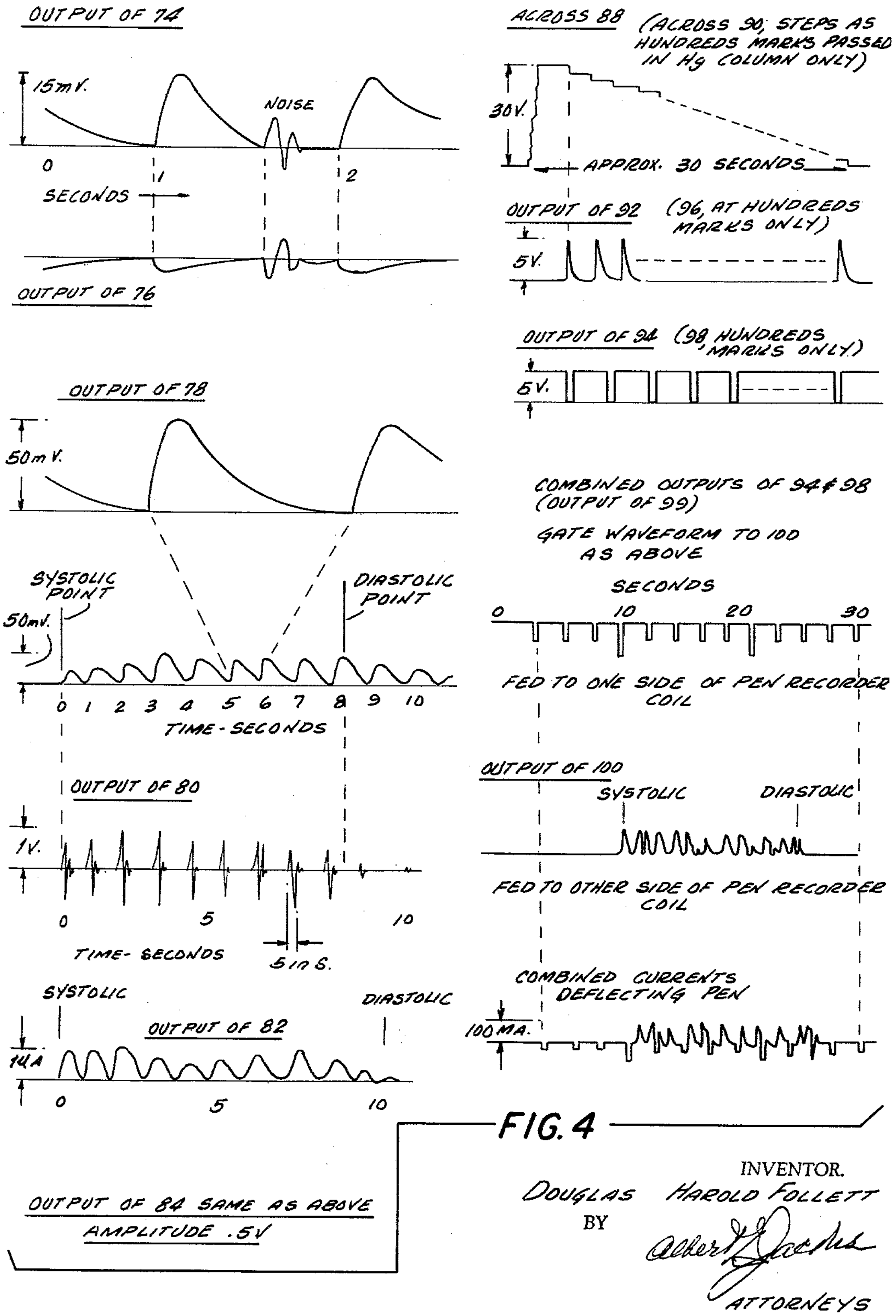
FIGURE 4 shows the wave patterns of certain elements of FIGURE 3.

Referring now to FIGURE 2, the control circuits set out schematically are operated from the mains or other suitable source of electrical energy 36. The circuit may be either energized manually by operation of the push button switch 38, or it may be automatically energized by a timer motor 40 connected across the mains. The timer motor operates a switch 42 at predetermined intervals which completes the circuit to a relay F. The relay F on energization causes its contacts F1 to be closed. The main circuit is then completed if a switch 44 in series with the contacts F1 has been previously closed. The closure of either the manually operable push button switch 38 or the switch 42 completes the circuit to a relay A which is thus energized. The relay A has a "hold-on" contact A1 and a "make" contact A2. The contact A1 ensures that the relay A remains energized. The contact A2 does not initially have any effect on the circuit because the circuit is broken by an open contact B1. In parallel with the relay A is the energizing coil V2 for the valve 30. Also in parallel is the circuit to the energizing coil V1 of the valve 18, which is completed through closed contacts E1 and B2 of relays E and B whose function will be described later on. The motor 12 of the pump 10 is in parallel with the energizing coil V1 of the valve 18.

The main circuit also includes a contact C1 of a relay C, a normally closed manual stop switch 46, a pair of parallel contacts B1 and D1, the circuit at the start being completed through the contact B1. In the other position the contact B1 completes the circuit to the relay B through the contact A2 when the relay A is energized. The circuit to the relay B may also be completed through the contact E1 when the relay E is energized.

Two pressure selectors 48 and 50 are included in the circuit and each comprise a wiper respectively connected to the energizing coils of relays E and D. The former selector constitutes the upper pressure selector and has eleven contacts connected to points in the mercury manometer representing pressures of from 300 mm. Hg down to 100 mm. Hg in increments of 20 mm. Hg The latter selector constiutes the lower pressure selector and has eight contacts connected to points in the mercury manometer representing pressures of from 180 mm. Hg down to 40 mm. Hg in increments of 20 mm. Hg. The mercury column and the terminal Z are connected to a 30 volt D.C. supply, the negative side of the supply being earthed as shown in the drawing. Two main parallel circuits run from the terminal Z to earth. The first is through a 680 ohm resistor, a zener diode 52 and the energizing coil of the relay C. In addition a contact of a time limiting delay switch 54 is adapted to short out the zener diode 52 and the relay C. Further a remote stop switch jack 56 serves the same purpose. The second circuit is through the timer switch 42 and the energizing coil of the relay F. Relay C has two functions. In association with the zener diode 52, it breaks the mains supply to the control circuit if the 30 volt line falls below 20 volts, although this voltage is still adequate to operate relays D and E. Secondly the relay C may be short circuited by closing either the remote stop switch jack 56 or by the closing of the contact of the time limiting delay switch 54. Normally during a run, the heater of the time limiting delay switch is connected to the mains voltage through a step-down transformer 58. Should the run not be terminated, the contact closes after a predetermined time and deenergizes relay C.

Two lamps 60 and 62 respectively colored red and amber are connected across the 4 volt heater supply to the time limiting delay switch 54, which are switched into circuit by a contact B3 of the relay B. In the de-energized position the lamp 62 is lit, and in the energized position the lamp 60 is lit. A green colored lamp 61 is separately energized from the 4 volt supply through a normally closed contact A3 of the relay A. The green lamp 61 is therefore lit when the relay A is energized indicating that a sequence of operation is in progress. When the amber and green lamps are on together, the pressure is building up, and when the green and red lamps are on together, the pressure is decaying.

The recording apparatus is of conventional design and includes a paper drive motor 64, a pen energizing coil 66, a stylus 68, and a variable potentiometer 70 acting as the stylus heat control.

The operation of the control circuit is commenced by the closing of the push button switch 38 or the closing of the contacts F1 controlled from the timing circuit. Relay A is energized, the valves 18 and 30 are respectively opened and closed, and the pump motor 12 is started. The pressure starts to rise and the relay D is operated in the example illustrated when the level of the mercury reaches the 120 mm. Hg mark. Contact D1 closes, but this has no effect on the circuit because this section is already closed by the contact B1. When the pressure reaches the upper limit, which is 240 mm. of Hg, the relay E operates and changes over its contact E1. The effect of this is to energize the relay B, stop the pump motor 12, and close the valve 18. When the relay operates, contact B1 closes, which completes a hold-on circuit to the relay B through the closed contact A2. Contact B2 opens. The pressure now startes a gradual fall due to the leak through the leak regulator 26. Relay E becomes de-energized, but this has no effect on the circuit since contact B2 is open. When the pressure reaches the lower limit, the relay D is de-energized, causing contact D1 to open and break the circuit to the relay A and the energizing coil of valve V2. The de-energization of the relay A causes contacts A1 and A2 to open. The latter contact breaks the circuit to relay B, and the circuit returns to the original state.

After a predetermined interval of time the whole process repeats itself when the timer motor 40 closes its contact 42 thus energizing relay F, and causing its contact F1 to complete the main circuit. The sequence can be stopped after any number of cycles by operating the remote stop switch jack 56, which short circuits the relay C thus breaking the main circuit.

The control circuit always fails safe. If the pressure rises too high, the safety switch 28 opens. If the pressure remains up too long, the contact of the time limiting delay switch 54 closes to short circuit the relay C. Finally, if the mains fails, everything becomes de-energized and the pressure falls to zero.

Figure 3:
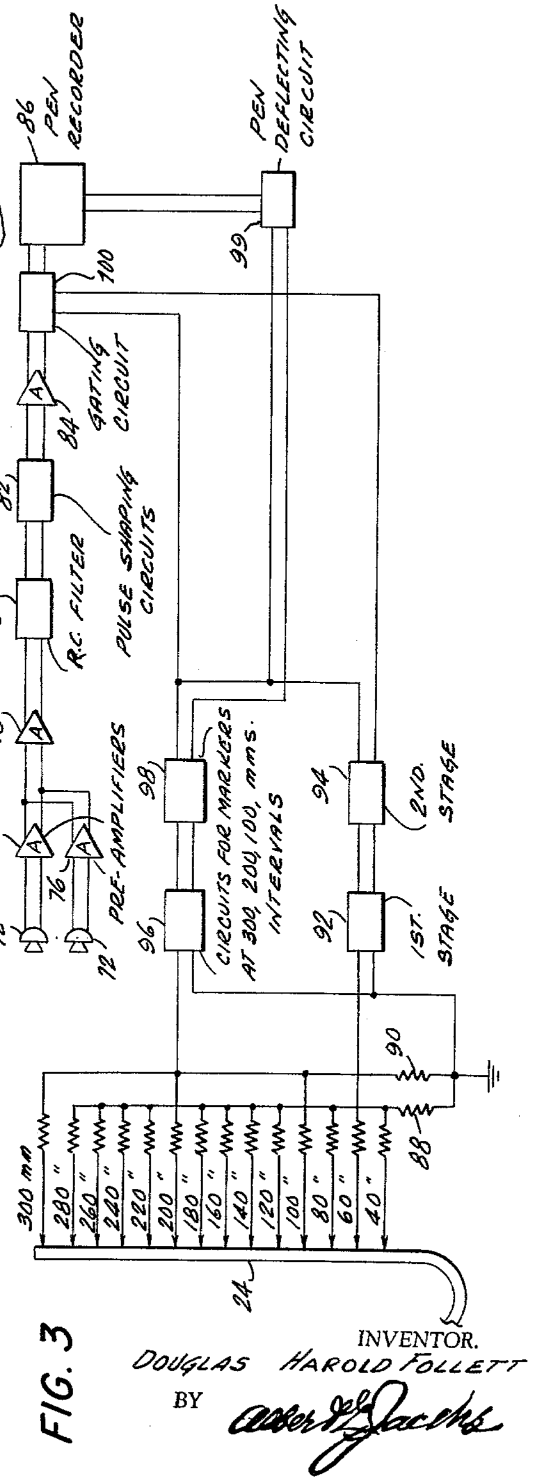
FIGURE 3 is an electrical block diagram of the recording system.

The electro-acoustic side of the apparatus and means for recording the pulses will now be described in greater detail with reference to FIGURE 3. Pulses from a pair of microphones 72 are first amplified by a pair of preamplifiers 74 and 76 situated on a shoulder strap or fixed near the patient's arm. The signals are then further amplified in a stage 78 before being fed into a three stage R-C filter 80 which attenuates frequencies on either side of a central frequency. The magnitude and range of frequency attenuations can be adjusted in known manner. In conjunction with the fall of current gain of the transistors at higher frequencies, this produces a response similar to that of the ear.

The output from the filter 80 consists of positive and/or negative pulses of duration 2–5 milliseconds. Since the pen recorder cannot follow these fast changes, these pulses are passed into pulse shaping circuits 82 in order to lengthen the pulses and at the same time making them all the same polarity and to some extent discriminating against A.C. interference.

The fast pulses are fed to an emitter-follower and sign inverter included within the pulse shaping circuits 82 which produce signals of opposite polarity at a low impedance level. By means of a bridge rectifier system two condensers are charged to voltages of opposite polarity but of magnitude equal to the pulse size. The output is obtained by summing the two condenser voltages. Since one condenser has five times the capacity of the other, the output pulse has a rise time governed by the shorter time constant and a decay time governed by the larger time constant.

Any A.C. present charges both condensers to a fixed level, and these voltages tend to cancel in the output. The output from the pulse shaper 82 is at low level, due to the high resistances needed to obtain reasonable time constants, and consists of negative pulses of about 100 ms. duration. These are amplified in an amplifier 84 and used to deflect the pen recorder 86 to one side.

The calibration of the recorder is obtained from contacts on the mercury column 24. As the column falls each contact breaks in turn, resulting in a "staircase waveform" across the 1*k* load resistors 88 and 90. At the collector of the first stage 92, there appears a saw-tooth wave with positive-going edges. These cut-off the second stage 94 for a time depending on the base circuit time constant, resulting in approximately square pulses at the output.

There are separate circuits 96 and 98 for the markers at 300 mm., 200 mm. and 100 mm. intervals. The two outputs are combined in a suitable ratio in a circuit 99 and deflect the pen recorder in the opposite direction to the signal pulses.

A simple gating circuit 100 is used to cut-out the signal pulse if a pressure marker occurs at the same time, but since the pressure markers are shorter than the signal pulses, the latter are not completely obliterated.

The balanced input circuit from the microphones to the amplifiers is used mainly to reduce A.C. pick up. However, with a sufficiently well shielded microphone design, it may be possible to use a single sided input. It may be necessary in any case to use an earthing electrode on the patient's arm, and this may be incorporated in the cuff or microphone casing.

Shunt capacitors are used on the input amplifiers 74 and 76 in order to match the impedance of the microphones 72 to the impedance of the input stage of the transistor amplifier.

In operation the sounds from the brachial artery are picked up by the microphones 72 and amplified. They are then passed through the filter 80 whose response to different frequencies is similar to that of the ear. The magnitude of the electrical output from the filter 80 then bears some relation to the loudness of the sound as heard by a physician. After suitable shaping in the pulse shaping circuits 82, the electrical pulses from the filter 80 deflect a pen recorder 86 to one side. The points where the pulses start and stop on the recording represent systolic and diastolic pressure. These pressures are estimated by the calibration circuit just described.

Although the specific example describes an arrangement using two microphones, the circuit may operate satisfactorily on one microphone. In ordinary medical practice a doctor will listen with a stethoscope at a certain position and if he cannot hear very clearly he will move his stethoscope a fraction of an inch. This, of course, cannot be done if the apparatus is strapped to the arm of the patient. With the twin microphone arrangement one or other of the microphones will be on the best spot for listening and the difference between the two recordings is the result recorded on the graph. A second advantage of the twin microphone arrangement is that they tend to cut out muscle noises if the patient moves his arm a little.

Other and further uses and modifications will be appreciated by those skilled in the art with reference to this specification and the appended claims.

What I claim and desire to secure by Letters Patent is:

1. Apparatus for recording the systolic and diastolic blood pressure at predetermined intervals of time which comprises a pair of microphones for converting the sounds from an artery into electrical signals, an amplifier connected to the output from the microphones, a filter connected to the outputs of the amplifier, the response of said filter to the different frequencies being similar to that of the human ear, a pen recording mechanism fed from the output of the filter, a cuff adapted to be placed around a patient's arm and inflated by air, a manifold to which the cuff is connected, a valve connected to said manifold, a pump connected to the manifold through said valve for building up air pressure in said cuff to a certain predetermined upper level above that of the normal systolic blood pressure, a manometer connected to the manifold, an electrically operated control device actuated by the level of liquid in the manometer, means for permitting the pressure to decay linearly between said upper level and a predetermined lower level below that of the normal diastolic blood pressure, a second valve for releasing the pressure in said cuff once the lower level has been reached, said control device stopping the pump when the upper level has been reached and closing said first mentioned valve between the manifold and pump and also opening said second valve when the lower level has been reached, and means for recommencing the cycle of operation after a predetermined period of time.

2. Apparatus for recording the systolic and diastolic blood pressure at predetermined intervals of time which comprises a pair of microphones for converting the sounds from an artery into electrical signals, an amplifier connected to the output from the microphones, a three stage R.C. filter connected to the output from the amplifier, said filter having a characteristic which attenuates the frequencies on either side of a central frequency, a pen recording mechanism fed from the output of the filter, a cuff adapted to be placed around a patient's arm and inflated by air, a manifold to which the cuff is connected, a valve connected to said manifold, a pump connected to the manifold through said valve for building up air pressure in said cuff to a certain predetermined upper level above that of the normal systolic blood pressure, a manometer having electrically conductive liquid therein connected to the manifold, adjustable lower and upper pressure selectors having movable wiper arms to make contact with the electrically conductive liquid, an electrically operated control device actuated from electrical contact through the wiper arms of the two pressure selectors, means for permitting the pressure to decay linearly between said upper level and a predetermined lower level below that of the normal diastolic blood pressure, a second valve for releasing the pressure in said cuff once the lower level has been reached, said control device stopping the pump when the upper level has been reached and closing said first mentioned valve between the manifold and pump and also opening said second valve when the lower level has been reached, and means for recommencing the cycle of operation after a predetermined period of time.

3. Apparatus according to claim 1 wherein a pressure sensitive device is associated with the manifold and opens said second valve immediately should the pressure exceed a level in excess of the upper level.

4. Apparatus for recording systolic and diastolic blood pressure at predetermined intervals of time which comprises a pair of microphones for converting the sounds from an artery into electrical signals, a pair of pre-amplifiers connected to the outputs of respective microphones, an amplifier connected to the output from each pre-amplifier, a three stage R.C. filter connected to the output of the amplifier, the response of said filter to the different frequencies is similar to that of the human ear, a pen recording mechanism fed from the output of the filter, a cuff adapted to be placed around a patient's arm and inflated by air, a manifold to which the cuff is connected, a valve connected to said manifold, a pump connected to the manifold through said valve for building up air pressure in said cuff to a certain predetermined upper level above that of the normal systolic blood pressure, a manometer with liquid therein connected to the manifold, an electrically operated control device actuated by the level of liquid in the manometer, means for permitting the pressure to decay linearly between said upper level and a predetermined lower level below that of the normal diastolic blood pressure, a second valve for releasing the pressure in said cuff once the lower level has been reached, said control device stopping the pump when the upper level has been reached and closing said first mentioned valve between the manifold and pump and also opening said second valve when the lower level has been reached, a switch in the main circuit to the control device, a timer motor which closes said switch at predetermined intervals, a first relay in the control device, a second relay having a contact in circuit with the energizing coil of the first relay, a delayed action switch in the energizing circuit of the second relay to de-energize the first relay through the action of the second relay should the cycle not finish within a predetermined time, and a manually actuated switch in parallel with said delayed action switch.

5. Apparatus according to claim 4, wherein a calibration circuit is provided between the manometer and the pen recorder, so that the latter may be calibrated from the former.

6. Apparatus for recording the systolic and diastolic blood pressure at predetermined intervals of time which comprises a pair of microphones for converting the sounds from an artery into electrical signals, an amplifier connected to the output from the microphones, a filter connected to the outputs of the amplifier, the response of said filter to the different frequencies being similar to that of the human ear, a pulse shaping circuit fed from the output of the filter, a further amplifier connected to the output of the pulse shaping circuit, a gating circuit fed from the output of the further amplifier, a pen recording mechanism fed from the output of the filter, a cuff adapted to be placed around a patient's arm and inflated by air, a manifold to which the cuff is connected, a valve connected to said manifold, a pump connected to the manifold through said valve for building up air pressure in said cuff to a certain predetermined upper level above that of the normal systolic blood pressure, a manometer having electrically conductive liquid therein connected to the manifold, adjustable lower and upper pressure selectors having movable wiper arms to make contact with the electrically conductive liquid, an electrically operated control device actuated from electrical contact through the wiper arms of the two pressure selectors, means for permitting the pressure to decay linearly between said upper level and a predetermined lower level below that of the normal diastolic blood pressure, a second valve for releasing the pressure in said cuff once the lower level has been reached, said control device stopping the pump when the upper level has been reached and closing said first mentioned valve between the manifold and pump and also opening said second valve when the lower level has been reached, a switch in the main circuit to the control device, a timer motor which closes said switch at predetermined intervals, a first relay in the control device, a second relay having a contact in circuit with the energizing coil of the first relay, a delayed action switch in the energizing circuit of the second relay to de-energize the first relay through the action of the second relay should the cycle not finish within a predetermined time, a manually actuated switch in parallel with said delayed action switch, a calibration circuit between the manometer and the pen recorder, said circuit including means for generating a staircase signal as the column of electrically conductive liquid in the manometer falls, and means for deriving a series of pulses from the staircase signal, said pulses producing marks on the pen recorder in the opposite sense to the signal pulses to indicate the pressure in the manometer during the linear decay, the calibration pulses momentarily blocking the output signals from the further amplifier through the gating circuit.

7. Apparatus according to claim 6 wherein the staircase signal is generated across a resistor and two separate pulse generating circuits are provided, one for generating pulses only at intervals of 100 mm. of Hg and the other at intervals of 20 mm. Hg, said circuits being identical and each including a circuit for generating pulses from the staircase signal, and a circuit for reshaping these pulses into square waves, the outputs from the two circuits being combined and fed to the gating circuit and pen recorder.

References Cited by the Examiner

UNITED STATES PATENTS

| | | | |
|---|---|---|---|
| 2,149,690 | 3/1939 | Snyder | 128—2.05 |
| 2,193,945 | 3/1940 | Strauss | 128—2.05 |
| 2,352,875 | 7/1944 | Williams | 128—2.05 |
| 2,379,573 | 7/1945 | Gilson | 128—2.05 |
| 2,875,750 | 3/1959 | Boucke | 128—2.05 |
| 2,980,107 | 4/1961 | Hurley | 128—2.05 |
| 3,086,513 | 4/1963 | Newland | 128—2.05 |
| 3,101,082 | 8/1963 | Steen | 128—2.05 |
| 3,104,661 | 9/1963 | Halpern | 128—2.05 |

RICHARD A. GAUDET, *Primary Examiner.*

LOUIS R. PRINCE, *Examiner.*

SIMON BRODER, *Assistant Examiner.*